United States Patent
Hartramph et al.

(10) Patent No.: US 7,323,798 B2
(45) Date of Patent: Jan. 29, 2008

(54) MICROWAVE DISPLACEMENT MEASUREMENT SYSTEM FOR AN ELECTRODYNAMIC DIRECT DRIVE

(75) Inventors: Ralf Hartramph, Albershausen (DE); Matthias Finkbeiner, Mötzingen (DE); Thomas Reininger, Wernau (DE)

(73) Assignee: Festo AG & Co., Esslingen (DE)

( * ) Notice: Subject to any disclaimer, the term of this patent is extended or adjusted under 35 U.S.C. 154(b) by 272 days.

(21) Appl. No.: 10/994,195

(22) Filed: Nov. 19, 2004

(65) Prior Publication Data

US 2005/0121985 A1 Jun. 9, 2005

(30) Foreign Application Priority Data

Dec. 4, 2003 (EP) .................................. 03027923

(51) Int. Cl.
*H02K 11/00* (2006.01)
(52) U.S. Cl. .................................. 310/68 B; 310/68 R
(58) Field of Classification Search ................. 310/12, 310/15, 68 R, 68 B
See application file for complete search history.

(56) References Cited

U.S. PATENT DOCUMENTS

| | | | | |
|---|---|---|---|---|
| 3,909,713 A | * | 9/1975 | Billeter ........................ 324/636 |
| 5,257,014 A | | 10/1993 | Zimmermann |
| 5,440,183 A | * | 8/1995 | Denne ........................... 310/12 |
| 5,717,330 A | * | 2/1998 | Moreau et al. ......... 324/207.13 |
| 6,084,326 A | * | 7/2000 | Nagai et al. .................... 310/80 |
| 6,300,590 B1 | | 10/2001 | Lauer et al. ............. 219/121.6 |
| 6,326,706 B1 | * | 12/2001 | Zhang ........................... 310/12 |
| 6,329,728 B1 | * | 12/2001 | Kitazawa et al. ............. 310/14 |
| 6,400,047 B1 | | 6/2002 | Hartramph et al. |
| 6,445,193 B1 | * | 9/2002 | Trummer et al. ............ 324/644 |
| 6,530,756 B2 | * | 3/2003 | Morita et al. ............... 417/417 |
| 6,540,485 B2 | * | 4/2003 | Nara et al. .................. 417/44.1 |
| 6,549,873 B1 | * | 4/2003 | Nagai ........................... 702/159 |
| 6,626,651 B2 | * | 9/2003 | Akazawa et al. ............ 417/417 |
| 6,642,844 B2 | * | 11/2003 | Montague ..................... 340/524 |
| 6,713,389 B2 | * | 3/2004 | Speakman ................... 438/674 |
| 6,856,049 B2 | * | 2/2005 | Hirata .......................... 310/12 |
| 7,098,671 B2 | * | 8/2006 | Bassali et al. ............... 324/642 |
| 2001/0022473 A1 | * | 9/2001 | Hartramph .................... 310/12 |
| 2002/0047314 A1 | * | 4/2002 | Takedomi ..................... 310/12 |
| 2005/0121985 A1 | * | 6/2005 | Hartramph et al. ........... 310/14 |

(Continued)

FOREIGN PATENT DOCUMENTS

DE 19709044 A1 * 11/1997

(Continued)

*Primary Examiner*—Thanh Lam
(74) *Attorney, Agent, or Firm*—Hoffman & Baron, LLP

(57) ABSTRACT

An electrodynamic direct drive includes an armature that travels within a housing and a drive system for moving armature in relation to housing. The drive system has two drive means, that are moved in relation to each other in the form of a coil system with at least one coil and a magnet system with at least one permanent magnet to move a load driver coupled with the armature. A displacement measurement space is defined by an end face of the armature and walls of the housing and/or the surface of the internally placed drive means. A sensor detects position of the armature within the housing by electromagnetic waves. The distance of the armature from the sensor is measured on the basis of the transit time of electromagnetic waves.

11 Claims, 1 Drawing Sheet

U.S. PATENT DOCUMENTS

2005/0271250 A1* 12/2005 Vallone et al. .............. 382/103

FOREIGN PATENT DOCUMENTS

| DE | 19712374 | A1 | 10/1998 |
| DE | 19853942 | C1 | 7/2000 |
| DE | 20113014 | U1 | 11/2001 |
| WO | WO 99/31463 | | 6/1999 |

* cited by examiner

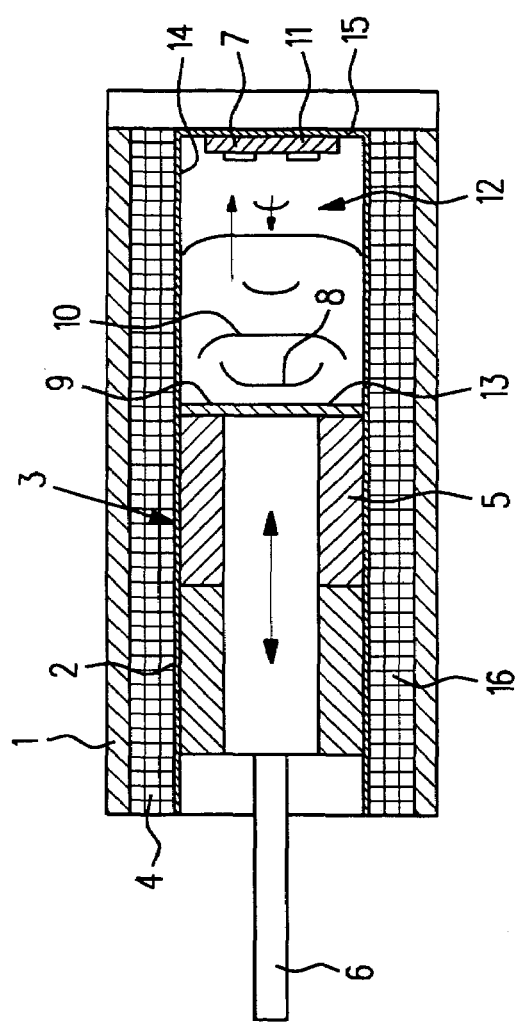
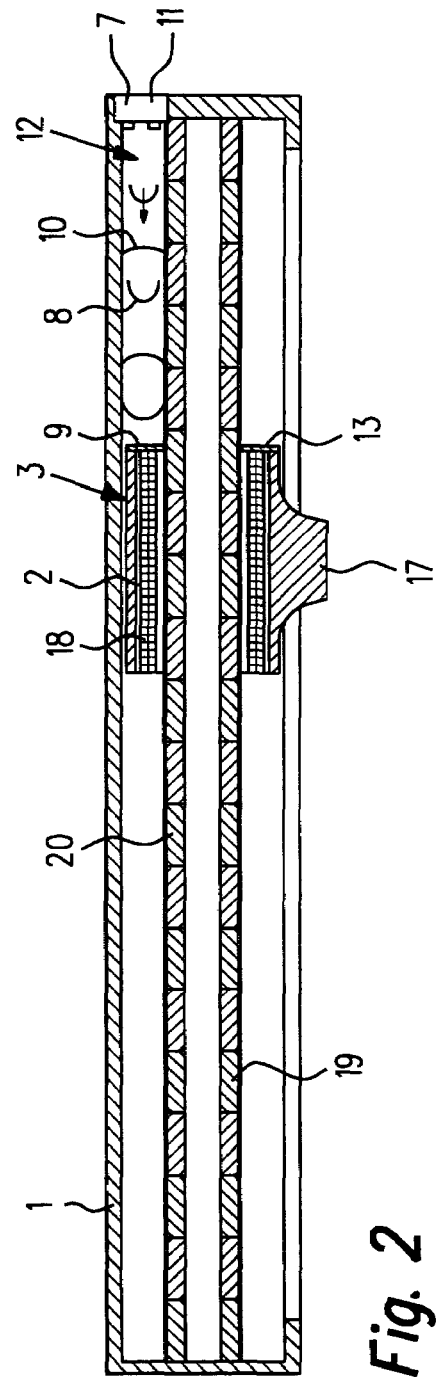

MICROWAVE DISPLACEMENT MEASUREMENT SYSTEM FOR AN ELECTRODYNAMIC DIRECT DRIVE

CROSS-REFERENCE TO RELATED APPLICATION

This application claims priority based on European Patent Application No. EP 03 027923.6 filed on Dec. 4, 2003, which is incorporated herein by reference.

FIELD OF THE INVENTION

The invention relates to an electrodynamic direct drive and more particularly to a linear drive, comprising an armature adapted to travel within a housing, a drive system for moving such armature in relation to said housing, such drive system having two drivingly cooperating drive means, able to be moved in relation to each other, in the form of a coil system with at least one coil, and a magnet system with at least one permanent magnet in order to move a load driver coupled with the armature.

BACKGROUND OF THE INVENTION

The German patent publication 19,853,942 C1 discloses a linear drive of this type comprising a housing defining a receiving space wherein drive means are arranged. The drive means are a component of an electric linear motor, which is inserted into the receiving space as a cartridge-like unit and is fixed in relation to the housing. The housing in this case delimits the elongated receiving space, within which the drive means are provided. By the supply of electrical energy it is possible for the armature to be moved along the longitudinal axis within the said space. A load driver is connected with the armature and a component to be moved is attached to it. The component to be moved by the linear motor or, respectively, the linear drive may for example be a guide slide of a machine tool.

The German patent publication (utility model) 20,113,014 U1 discloses an electrodynamic linear direct drive. This linear direct drive comprises a housing with a receiving space extending in the longitudinal direction of the housing. Within the housing an elongated stator in the form of a support tube is arranged, on which the annularly designed permanent magnets are arranged coaxially in sequence. In order to act as a magnetic return the elongated stator may consist of magnetically conductive material and more particularly of low retentivity material. The armature with a coil winding is arranged on this stator. On excitation of the coil the armature may be moved in relation to the stator in the longitudinal direction of the housing and by way of the load driver entrains the component which is to be moved.

For the electrical control or, respectively, regulation of the electrodynamic direct drive it is important for the position of the armature and accordingly furthermore of the component attached to the load driver, to be detected. Hitherto for this purpose a relative zero point has been set for the armature, in relation to which the absolute position of the armature is detected during operation. Such methods of measurement are slow and require the employment of additional staff, since the position of the armature must be reset or calibrated in relation to the zero point.

Furthermore so far various different measurement methods have been tried out rendering possible automatic displacement measurement of the armature in relation to the housing, the use of displacement measurement based on electromagnetic waves, such as microwaves, radar waves or the like not so far having been considered, since the coils and permanent magnets within the housing possess a magnetically conductive surface, on which the electromagnetic waves are propagated and therefore render impossible or substantially interfere with, any displacement measurement.

The patent publication WO 99/31463 describes a distance measuring device and a method for measuring the relative distance of a piston within a cylinder. The distance measuring device for example comprises a microwave sensor as a sensor, which on the basis of the reflection of the microwaves may detect the position of the piston. Unlike electrodynamic linear direct drives the surface of the cylinder and the piston constitutes a surface which cannot so influence the electromagnetic waves that accurate measurement is not feasible. The bore of the cylinder is for example defined by an electrically conductive material or a plastic so that measurement on the basis of electromagnetic radiation functions in any case. However when, as in the case of an electrodynamic direct drive, magnetically conductive surfaces play role, such displacement measurement has not been possible so far.

SUMMARY OF THE INVENTION

One object of the invention is to provide an electrodynamic direct drive with an alternative displacement measurement system which may be applied to the direct drive in the simple manner and involves a substantial economic advantage because the absolute position of the armature further processed in the control or, respectively, regulation system.

In order to achieve these and/or other objects appearing from the present specification, claims and drawings, in the present invention an electrodynamic direct drive and more particularly a linear drive, comprising an armature adapted to travel within a housing, a drive system for moving such armature in relation to said housing, such drive system having two drivingly cooperating drive means, able to be moved in relation to each other, in the form of a coil system with at least one coil, and a magnet system with at least one permanent magnet in order to move a load driver coupled with the armature is characterized in that a displacement measurement space is defined by an end face of the movable armature and the walls of the housing and/or the surface of the internally placed drive means and a sensor is adapted to detect the position of the armature within the housing by way of electromagnetic waves, the distance of the armature from the sensor being able to be measured on the basis of the transit time of electromagnetic waves and the end face and the inner face of the displacement measurement space are constituted by an electrically conductive surface material in order to provide a reflecting surface for a optimum measuring function of the microwave sensor.

The microwave displacement measuring system is particularly well adapted for electrodynamic linear direct drive motors without however being limited to same. For instance, electrodynamic direct drive motors may also be employed, in the case of which the armature travels along a curved path instead of a linear one. The significant point is only that the drive means comprises a coil system and a magnet system coupled electromagnetically with it. As related to the linear direct drive, normally several coil, placed coaxially in sequence, are contained in the coil system and a permanently magnetic armature moves in relation to the stator constituted by the coil system. On the other hand it is also possible for the coil system to be arranged on the armature, the stator being constituted by a plurality of permanent magnets placed coaxially in sequence.

Both alternative drive systems are preferably encapsulated within a housing and between an end face of the armature and a terminal housing wall a displacement measurement space is formed. In accordance with the invention displacement measurement space delimited by the housing itself or the drive means and the end face of the housing or, respectively, the end faces of the armature, is characterized by an electrically conductive surface. More particularly at those positions, at which magnetically conductive materials are arranged, a reflecting surface is provided, which is designed as to be electrically conductive. Owing to this reflecting surface any microwaves coming from the microwave sensor are not coupled with the surface, but reflected into the displacement measurement space. Accordingly there is only a small degree of interference with the measurement if at all.

The reflecting surface may be produced in the most various different manners. It may be a question of an electrically conductive metal tube, which is placed on the inner side of the housing or on the drive means or, respectively, within the drive means. The electrically conductive metal tube in this case has two functions since on the one hand it serves an anti-friction surface for the armature and on the other hand as an electrically conductive reflecting surface in the displacement measurement space. The reflecting surface may however only be constituted by a surface coating of electrically conductive manner. The reflecting surface is so produced that an electrically conductive material is also applied to the end faces of the armature, which delimit the displacement measurement space. In addition to the possibility of having a metal tube or surface coating, it is also possible to have a hollow body, which defines the displacement measurement space in a form differing from a tubular configuration. This hollow body would then have to be adapted to the displacement measurement space constituted by the drive means or, respectively, the housing wall.

A microwave transmitter is arranged within the housing and so aligned that the microwaves emitted by it are directed toward the end faces of the armature and the microwave sensor as well may be arranged within the housing in order to detect the microwaves reflected by the end faces of the armature. Preferably the microwave transmitter is designed so that it is integrated with the microwave transmitter. Accordingly the transmitting and receiving module may be readily integrated in the narrow displacement measurement space within a cartridge-type linear motor. Such a transmitting and receiving module can also be later integrated in an existing cartridge-type linear motor. The end faces of the armature, on which the microwaves impinge owing to alignment of the microwave sensor, are preferably planar. Accordingly the microwaves are reflected back to the transmitting and receiving module. If alternatively the microwave sensor has a position differing from the position of the microwave transmitter within the housing of the electrodynamic direct drive, the end face of the armature may also have a corresponding surface-configuration so that the reflected electromagnetic microwaves are reflected back to the sensor.

The displacement measurement space within the housing is for instance constituted by an electrically conductive metal tube on the inner side of the coil system and by the quasi planar end face of the armature so that the reflection of the microwaves may take place a linear direction from the microwave transmitter to the end face of the armature and back again to the microwave transmitter. Owing to the time measurements of the wave transit time and exact detection of the absolute position of the armature is possible.

The microwave transmitter and microwave sensor are so designed that they function in a frequency range of 1 to 60 GHz. Microwaves in accordance with this description relate at least to a frequency range of 1 through 60 GHz.

The electrically conductive surface material on the inner faces of the displacement measurement space and/or on the surface of the drive means is a metallic coating or a metallic screening surface. The metallic coating or the screening surface preferably include aluminum or nickel components. For instance in this case a wave guide is provided, which delimits the displacement measurement space and consists of a nickel alloy or is coated with a nickel surface layer. On the other hand however a wave guide in the form of aluminum section, which is provided about the moving armature and within the housing, may be employed to provide an electrically conductive displacement measurement space, which reflects the microwaves back to the microwave sensor in the reflection direction.

In the case of a further development of the invention the metallic reflecting surface is constituted by a wave guide or a thin-walled metal tube, which screens off the drive means at the surface from the displacement measurement space and furthermore permits the electromagnetic coupling of the direct drive for the forward movement of the armature. More particularly the wave guide or the thin-walled metal tube simultaneously constitutes an anti-friction sleeve for the armature so that same is able to run on the surface of the other drive means in the longitudinal direction of the housing.

The microwave sensor preferably detects the absolute position of the armature within with an electrical or, respectively, electronic evaluating unit in order to evaluate the position for control or, respectively, regulation of the direct drive. The microwave sensor renders possible measurement of the distance of the armature from the microwave sensor and once the overall path of displacement of the microwave sensor is known it is possible for the absolute position of the armature to be definitely ascertained. This means that the position of the component attached to the armature may also found, something which may also be employed for control or regulation of the position of the component.

In the case of a further development of the invention the armature is designed in the form of a permanent magnet and is able to be moved linearly on a stator with coaxially following coils in sequence. On the coil windings an anti-friction surface for the armature is provided which simultaneously constitutes a part of the metallic reflecting surface for the displacement measurement space. If for example the electrodynamic direct drive is in a cartridge-type guide, the same may be designed to be particularly compact. The housing itself then constitutes an iron return path, within which the coil windings are arranged on an electrically conductive coil support.

A reflecting surface is provided internally on the coil face for the displacement measurement space.

In the case of an alternative further development of the invention the armature has a plurality of axially wound coil windings or a plurality of coaxially arranged coils. The armature is mounted in a movable manner on a longitudinally directed stator in order to be movable in the longitudinal direction of the housing. The stator has several magnets arranged axially in the longitudinal direction of the housing so that the armature is able to be moved, after the supply of electrical energy, in relation to the stator.

In the case of this further development the displacement measurement space is formed between the surface of the stator and the inner faces of the housing and the end faces of the housing and the armature. More especially on the magnetic stator, which constitutes a part of the drive means, it is necessary for either an electrically conductive hollow body or an electrically conductive surface to be applied in order to constitute a reflecting surface for the microwaves. Additionally on the end face of the armature an electrically conductive surface is provided. However, there may also be a provision such that the armature itself is electrically conductive so that no extra surface has to be applied to the armature.

In accordance with the invention it is only necessary to ensure that the surfaces of the displacement measurement space are of electrically conductive materials or have electrically conductive reflecting surfaces. This means that displacement measurement using electromagnetic waves, and more particularly using microwaves, is not interfered with, since the electromagnetic waves are reflected to the displacement measurement sensor.

Further advantageous developments and convenient forms of the invention will be understood from the following detailed descriptive disclosure of embodiments thereof in conjunction with the accompanying drawings.

BRIEF DESCRIPTION OF THE DRAWINGS

FIG. 1 shows an electrodynamic direct drive with a permanently magnetic armature and a microwave sensor for finding the position of the armature in accordance with a first alternative of the present invention.

FIG. 2 shows an electrodynamic direct drive as a linear motor with a microwave sensor for finding the position of the armature in accordance with a second alternative of the present invention.

DESCRIPTION OF THE PREFERRED EMBODIMENTS

The electrodynamic direct drive is in one design in the form of a linear motor of the cartridge type, there being a magnetically conductive armature 2 within a housing 1, such armature 2 being able to be moved axially in the housing axially. A drive system 3 comprising two parts is provided for the linear motor, the first part having several coaxially arranged coils 4. The coils 4 are arranged on an electrically conductive coil support 16. On the outer side of the armature 2 a permanent magnet 5 is provided which constitutes the other drive means part of the two parts able to be moved in relation to each other.

The armature 2 is connected with a rod-like load driver 6 serving to propel the component to be moved. The armature 2 slides in a longitudinally directed means within the housing 1 on the inner surface of the coil system 4 so that a guide is formed within the coil system 4 acting as a stator.

Within the housing a microwave transmitter 7 is provided and emits microwaves 8 toward one end face 9 on the armature 2 and which detects the microwaves reflected by such end face 9 by means of the integrated microwave sensor 11.

Within the housing 1 of the electrodynamic direct drive a displacement measurement space 12 is formed, which is delimited by various reflecting surfaces. These reflecting surfaces are all electrically conductive, that is to say in the case of the permanently magnetic end face 9 of the armature 2 it is covered with an electrically conductive surface 13 or constituted by a tubular hollow body 14 as an electrostatically conductive anti-friction surface. On this anti-friction surface of the electrostatic hollow body 14 the armature 2 is able to slide. The electrically conductive material of the hollow body 14 is made so thin that the electromagnetic coupling between the armature 2 and the coil system 4 is subject to only minimum interference. Additionally an electrically conductive surface may be provided on the end face 15 of the housing, this feature however not being essential for the invention.

The linear motor functions as follows: if the coil system 4 is suitably excited by an electrical drive circuit, the armature 2 will move in the longitudinal direction of the housing 1 owing to the electromagnetic coupling between the two drive means, that is to say the coil system 4 and the magnet system 5. If the flow of current through the coils is reversed, the armature 2 and accordingly the load driver 6 as well with a component of the machine tool attached to it will be moved in the opposite direction.

The transmitter 7 emits the microwaves 8 toward the end face 9 of the armature 2 and the reflected microwaves 10 are detected in the microwave sensor 11 and evaluated in the regulation or, respectively, control circuit of the linear motor. Accordingly the linear motor may be exactly controlled and the displacement measurement may take place automatically.

The displacement measurement space 12, within which the microwaves 8 and 10 travel toward the end face and back to the sensor 11, is provided, in accordance with the invention, with electrically conductive surfaces. The materials are either, as in the case of the coil system 4, constituted by electrically conductive metal or a hollow body 14 is provided on the inner side of the drive means, such hollow body enhancing the electrical conductivity. More especially, an electrically conductive surface 13 is provided on the end face 9 of the permanently magnetic armature 2 so that the microwaves 8 and 10 are not damped in the magnetically conductive surface.

FIG. 2 shows a further electrodynamic direct drive in the form of a linear motor having a moving armature 2, which is coupled by way of a load driver 17 with a travelling component. The drive means 3 of the armature 2 is a coil 18 wound on a winding support forming part of the armature 2. The armature 2 slides on a stator 19 having coaxially arranged permanent magnets. The housing 1 is manufactured of electrically conductive material, which constitutes an iron return.

Within the housing 1 the microwave transmitter 7 is provided for emission of the microwaves 8 toward the end face 9 of the armature 2 and the microwaves 10 are reflected by the end face 9 of the armature 2 to the microwave sensor 11. It is in this manner that the absolute position of the armature 2 within the housing 1 may be exactly found. Since the stator 19 is provided with coaxial permanent magnets, an electrically conductive surface is provided over it, which for example consists of a thin layer of electrically conductive material 20. As an alternative in this case an aluminum tube arranged over the stator 19 may serve as an electrically conductive surface. The end face 9 of the armature 2 may also be furnished with an electrically conductive layer 13. Since the housing 1 itself consists of electrically conductive material, the surface is electrically conductive so that in this case no additional measure is necessary.

Owing to the design of the displacement measurement space 12 with the electrically conductive surfaces it is possible for the microwave sensor to perform measurement without excessive damping or interference and the exact position of the armature 2 may be determined. Accordingly a microwave measurement system is able to be employed effectively in the case of an electrodynamic direct drive with a permanently magnetic drive means, this not having been possible with the prior art.

The invention claimed is:

1. An electrodynamic direct drive and more particularly a linear drive, comprising an armature adapted to travel within a housing, a drive system for moving such armature in relation to said housing, such drive system having two drivingly cooperating drive means, able to be moved in relation to each other, in the form of a coil system with at least one coil, and a magnet system with at least one permanent magnet in order to move a load driver coupled with the armature, wherein a displacement measurement space is defined by an end face of the armature from which the load driver does not project and at least one of the walls of the housing and the surface of the internally placed drive means, and a sensor disposed within the displacement measurement space adapted to detect the position of the armature within the displacement measurement space by way of electromagnetic waves, the distance of the movable armature from the sensor being able to be measured on the basis of the transit time of electromagnetic waves, the end face and the inner face of the displacement measurement space comprising an electrically conductive surface material in order to provide a reflecting surface for an optimum measuring function of the sensor.

2. The direct drive as set forth in claim 1, wherein a microwave transmitter is arranged within the housing and is so directed that the microwaves emitted by it are directed toward the end face of the armature and wherein the sensor is arranged within the housing in order to detect microwaves reflected from the end face of the armature.

3. The direct drive as set forth in claim 2, wherein the sensor is integral with the microwave transmitter.

4. The direct drive as set forth in claim 2, wherein the microwave transmitter is adapted to operate in a frequency range of 1 to 60 GHz.

5. The direct drive as set forth in claim 1, wherein the electrically conductive surface material on the inner faces of the displacement measurement space and/or the surface of the drive means is a metallic coating or a metallic and electrically conductive coating or such a reflecting surface.

6. The direct drive as set forth in claim 1, wherein the metallic, electrically conductive or reflecting surface comprise aluminum or nickel components.

7. The direct drive as set forth in claim 1, wherein the metallic reflecting surface comprises a wave guide or a thin-walled metal tube, which screens off the drive means on the surface from the displacement measurement space and thereby permits an electromagnetic coupling of the drive system for the advance of the armature.

8. The direct drive as set forth in claim 1, wherein the sensor is adapted to find the absolute position of the armature within the housing is coupled with an electrical evaluating unit in order to evaluate the position for control or, respectively, regulation of the drive system.

9. The direct drive as set forth in claim 1, wherein the armature possesses a permanent magnet and is able to be linearly moved on the stator with the coaxially arranged coils and on the coil windings an anti-friction surface is provided for the armature, such surface simultaneously constituting a part of the metallic reflecting surface for the displacement measurement space.

10. The direct drive as set forth in claim 1, wherein the armature comprises a plurality of axially wound coil windings in order to run on a stator comprising a plurality of magnets arranged in the longitudinal direction of the housing and wherein the displacement measurement space is formed between the stator and the inner walls of the housing.

11. An electrodynamic direct drive and more particularly a linear drive comprising an armature adapted to travel within a housing, a drive system for moving such armature in relation to said housing, such drive system having two drivingly cooperating drive means, able to be moved in relation to each other, in the form of a coil system with at least one coil, and a magnet system with at least one permanent magnet in order to move a load driver coupled with the armature, wherein a displacement measurement space is defined by an end face of the armature from which the load driver does not project and at least one of the walls of the housing and the surface of the internally placed drive means, and a sensor disposed within the displacement measurement space adapted to detect the position of the armature within the displacement measurement space by way of electromagnetic waves, the distance of the movable armature from the sensor being able to be measured on the basis of the transit time of electromagnetic waves, the end face and the inner face of the displacement measurement space comprising an electrically conductive surface material in order to provide a reflecting surface for an optimum measuring function of the microwave sensor, a microwave transmitter being arranged within the housing and so directed that the microwaves emitted by it are directed toward the end face of the armature, the sensor being arranged within the housing in order to detect microwaves reflected from the end face of the armature.

* * * * *